United States Patent
Gomes de Oliveira

(10) Patent No.: US 11,035,104 B2
(45) Date of Patent: Jun. 15, 2021

(54) EQUIPMENT FOR CAPTURING AND STORING RAINWATER AND WATER OF OTHER ORIGINS

(71) Applicant: Leonardo Gomes de Oliveira, Contagem (BR)

(72) Inventor: Leonardo Gomes de Oliveira, Contagem (BR)

( * ) Notice: Subject to any disclaimer, the term of this patent is extended or adjusted under 35 U.S.C. 154(b) by 87 days.

(21) Appl. No.: 16/482,447

(22) PCT Filed: Feb. 1, 2018

(86) PCT No.: PCT/BR2018/050021
§ 371 (c)(1),
(2) Date: Jul. 31, 2019

(87) PCT Pub. No.: WO2018/141040
PCT Pub. Date: Aug. 9, 2018

(65) Prior Publication Data
US 2020/0032493 A1    Jan. 30, 2020

(30) Foreign Application Priority Data
Feb. 3, 2017   (BR) ................. 10 2017 002336.2

(51) Int. Cl.
*E03B 3/03* (2006.01)
*B65D 21/02* (2006.01)
*E04D 13/08* (2006.01)

(52) U.S. Cl.
CPC ............ *E03B 3/03* (2013.01); *B65D 21/0201* (2013.01); *E04D 2013/0873* (2013.01)

(58) Field of Classification Search
CPC .............. E03B 3/03; E04D 2013/0873; B65D 21/0201
See application file for complete search history.

(56) References Cited

U.S. PATENT DOCUMENTS

| | | | |
|---|---|---|---|
| 6,526,699 B1 * | 3/2003 | Foglio, Sr. ................ | E03B 3/03 52/15 |
| 8,474,195 B1 * | 7/2013 | Anchondo ................ | E04B 1/02 52/168 |

(Continued)

FOREIGN PATENT DOCUMENTS

| | | | | |
|---|---|---|---|---|
| FR | 2912162 A1 * | 8/2008 | ............... | E03B 3/03 |
| WO | WO-2006038602 A1 * | 4/2006 | ............... | E03B 3/03 |
| WO | WO-2010060147 A1 * | 6/2010 | ............... | E03B 3/03 |

OTHER PUBLICATIONS

Machine Translation WO 2006038602.*

*Primary Examiner* — Kevin F Murphy
(74) *Attorney, Agent, or Firm* — Scott Houtteman; Houtteman Law LLC

(57) ABSTRACT

The object of the present patent comprises an innovative system for harvesting runoff from rainwater and other sources, basically comprising tube-like vertical deposits with varied and adequate diameters to facilitate both assembly and construction of walls and fences, being self-supporting, modular, cost-effective, either built-in or surface-installed, being formed basically by vertical cylindrical pipes (2), preferably standard PVC water pipes, with the possibility of using metal or polymer sleeves along their lengths or applying an inner lining with fiber glass or any other material aimed at increasing the strength of large diameter pipes.

1 Claim, 8 Drawing Sheets

(56) References Cited

U.S. PATENT DOCUMENTS

| | | | |
|---|---|---|---|
| 8,720,723 B2* | 5/2014 | Morris | E03B 3/03 220/212 |
| 2009/0031625 A1* | 2/2009 | McAvoy | A01G 25/00 47/48.5 |
| 2014/0034152 A1* | 2/2014 | Drummond | E03B 3/03 137/363 |
| 2015/0135613 A1* | 5/2015 | Kim | E04H 9/14 52/173.1 |
| 2017/0260718 A1* | 9/2017 | Monroe | E03B 3/03 |

* cited by examiner

EQUIPMENT FOR CAPTURING AND STORING RAINWATER AND WATER OF OTHER ORIGINS

SCOPE OF THIS PATENT

To capture and store rainwater and other sources.

Facilitating and saving space for collecting and storing rainwater and other sources.

To reduce ecological impact by decreasing/eliminating the use of treated water to wash floors and vehicles, and to water flower and kitchen gardens.

STATE OF THE ART

The release of large amounts of carbon dioxide into the atmosphere has been pinpointed as the reason why the planet's atmosphere is trapping more and more heat.

This has clearly affected rainfall levels, resulting in long-standing droughts in places where such phenomenon had never been recorded before in such a remarkable way, as was the case in 2015 when the level of the Cantareira rainwater harvesting and storage system in São Paulo, Brazil, was so low that it forced millions of households to store water in pans and carboys, oftentimes collected from far-away sources.

In sharp and poignant contrast with this situation, while in some locations people were still using hoses to wash their sidewalks with treated water, in others, either there wasn't a drop of water available to drink or the available water had been collected and stored without taking any precautions to prevent contamination.

Water for storage and human consumption is usually provided by public utilities that use harvesting systems and dams from where small quantities of water are collected for treatment and storage, which do not last more than a few days. The treated water is then distributed to consumers, who also store it in overhead or underground water tanks to supply water to one or more families.

A REVIEW OF THE STATE OF THE ART

The capture and storage of water under circumstances other than the ones recommended by sanitation agencies is harmful to health.

In like manner, the use of treated water to wash sidewalks and vehicles, as well as to water flower and kitchen gardens is economically deleterious to less privileged people, in addition to overloading the demand during droughts, not to mention the ecological fingerprint left by the use of chemicals and energy, typical of water treatment plants.

Consumers use water to meet needs other than those for human consumption, such as to wash floors and vehicles and to water public and private gardens and kitchen gardens; however, Brazil does not have a public distribution system of clean raw water for non-human use, thereby adding to the cost of treated water.

IMPROVEMENTS TO THE STATE OF THE ART

The object of the present patent is to introduce a groundbreaking system for the storage of runoff from rainwater and from other sources, basically comprising tube-like vertical deposits with varied and adequate diameters to facilitate both assembly and construction of walls and fences, being self-supporting, modular, cost-effective, either built-in or surface-installed.

In other words, with the proposed solution, water can be stored without taking up otherwise useful spaces in the house or in urban areas, as is the case of conventional water storage systems, in addition to making water available at ground level, thereby minimizing or eliminating the need to use elevation pumps and the costs associated with underground deposits.

FIGURES AND PERFORMANCE

In order to make for a perfect understanding and visualization of the object of the present patent, the following illustration figures are provided herein:

The figures show a number of elements that work jointly to form modules, but it should be pointed out that the object of this patent also allows for the use of a stand-alone vertical cylindrical pipe or dozens of such pipes.

Below are detailed descriptions of the construction elements in a preferred embodiment of this patent.

Figure 1:
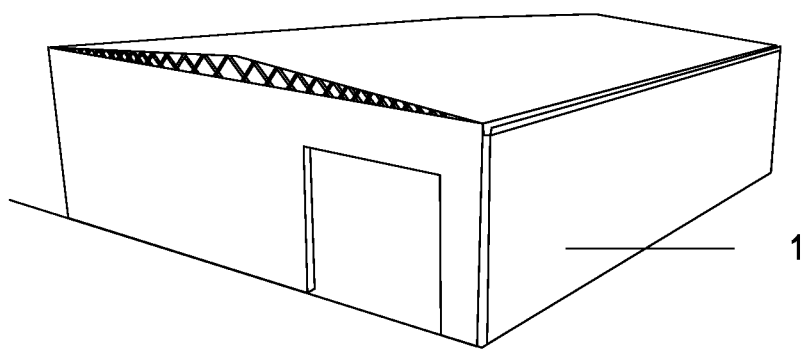
FIG. 1 shows a perspective view of the inventive concept in a shed-like construction.
Figure 2:
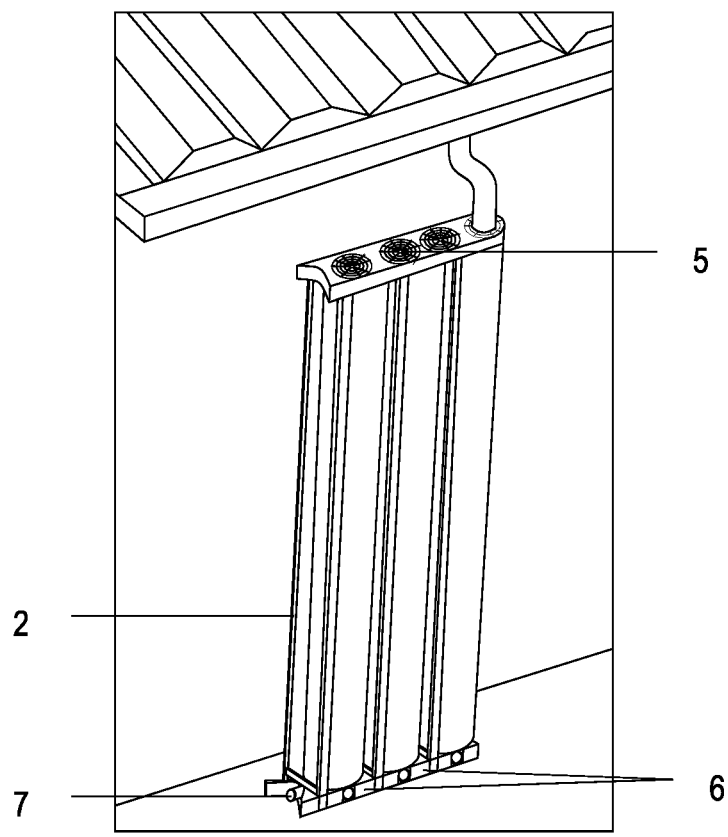
FIG. 2 shows a perspective view of an installed module, in a preferred embodiment, where main elements of the set, object of the present patent, can be seen.
Figure 3:
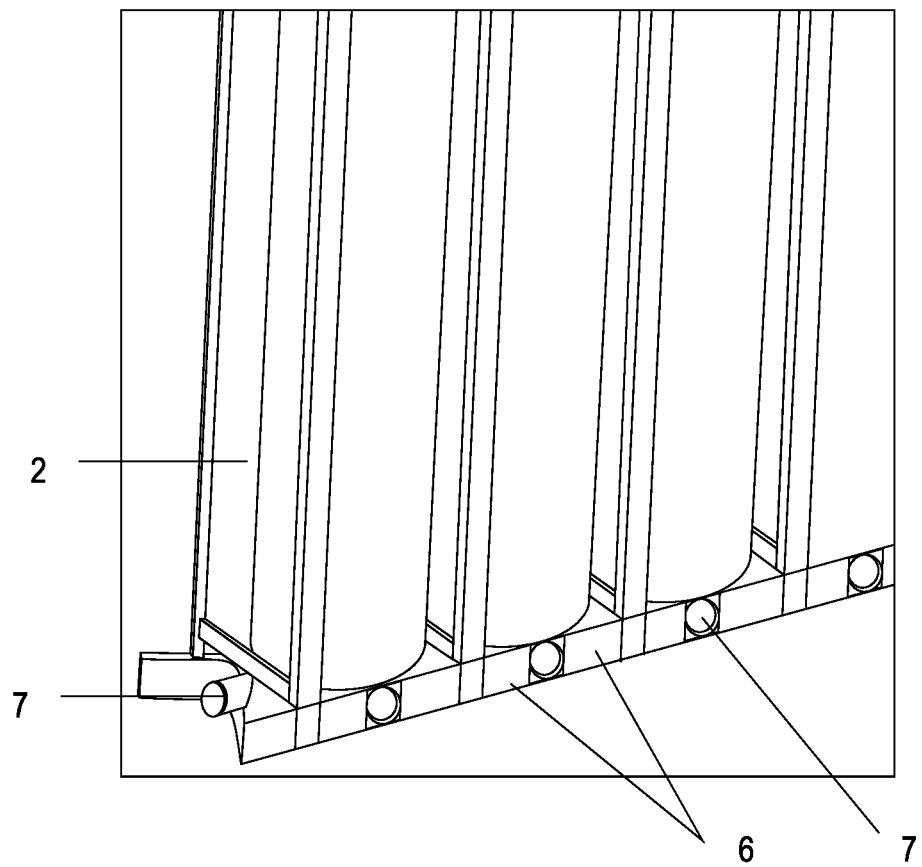
FIG. 3 shows a detailed view of FIG. 2 showing specific aspects of the interconnections at the bottom of the pipes.
Figure 4:
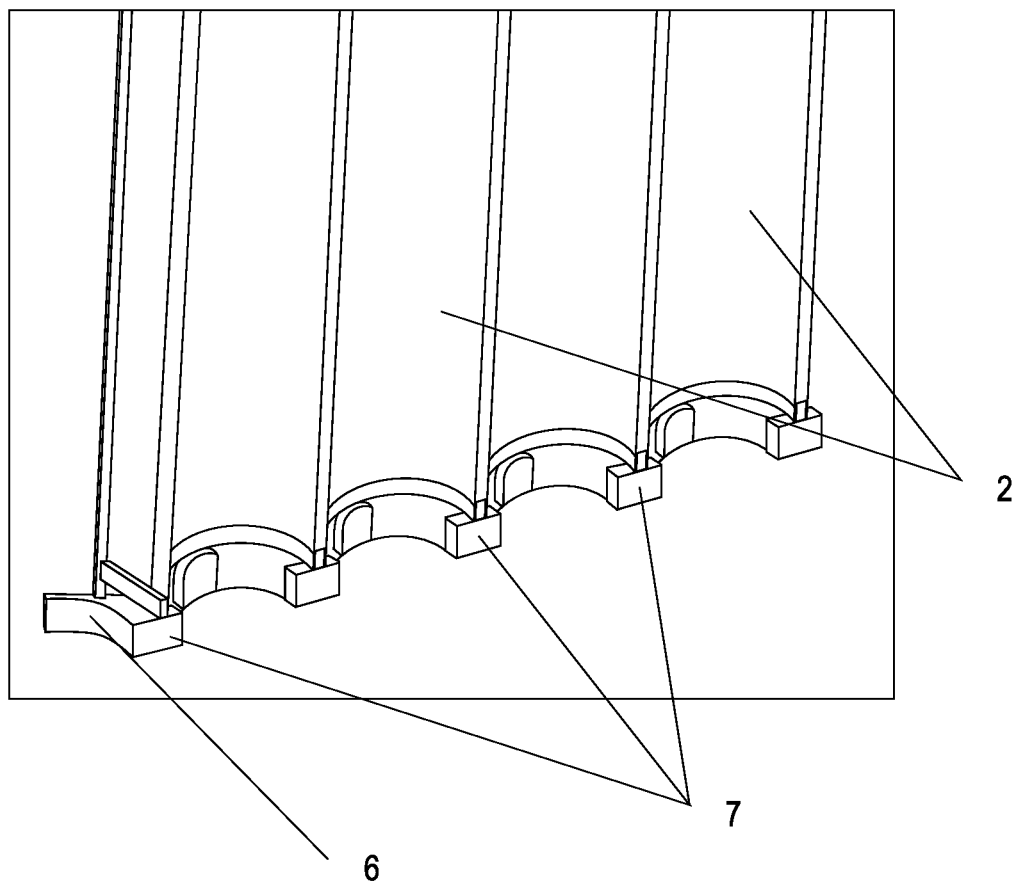
FIG. 4 shows a cross-section view where internal details can be seen at the bottom of the pipes.
Figure 5:
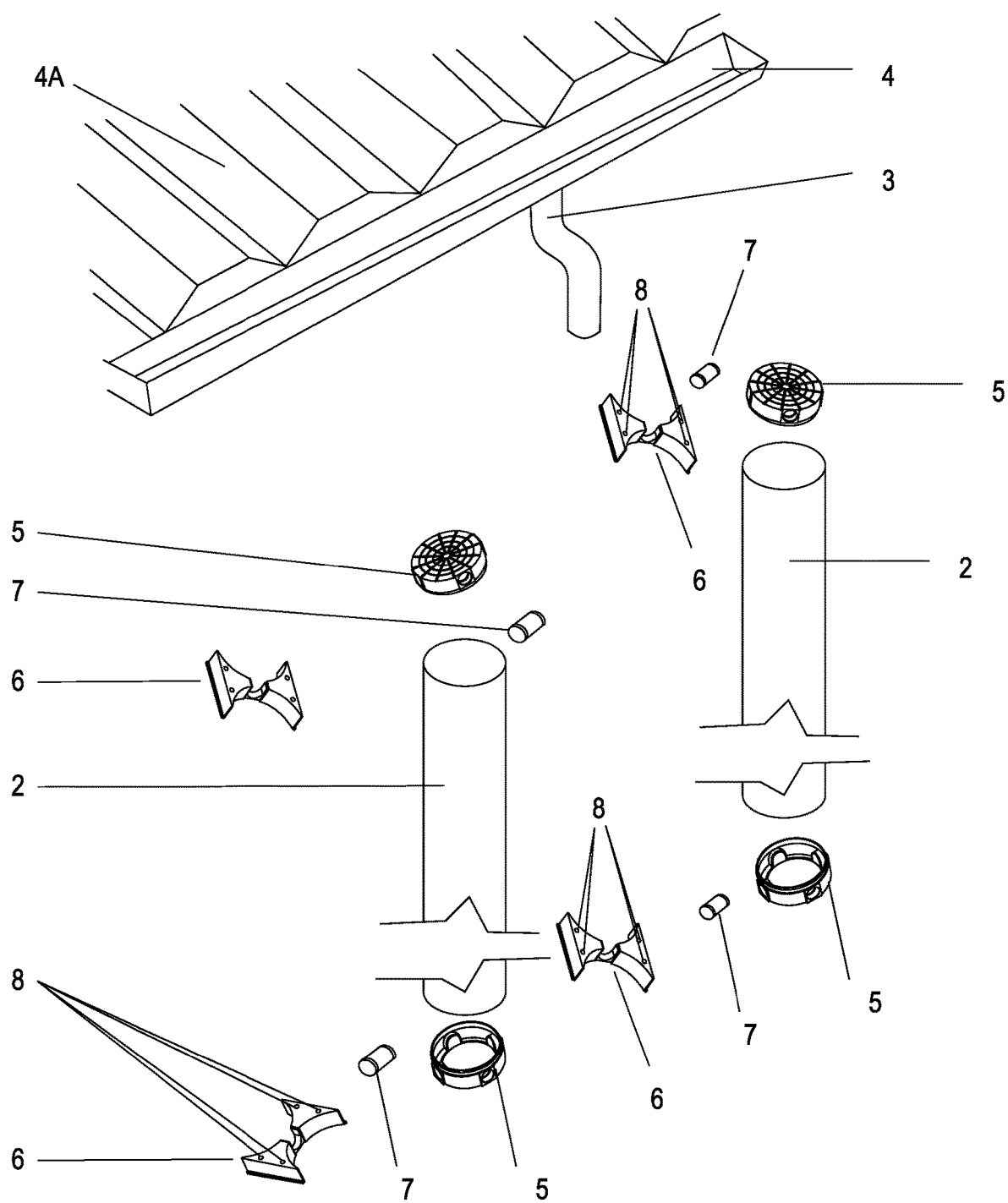
FIG. 5 shows an exploded perspective view of the basic set, object of the present patent.

FIG. 5 shows the basic module, object of the present patent, in an exploded view for better visualization, comprising a pair of vertical cylindrical pipes (2) preferably PVC water pipes, with other polymers or diverse material being also acceptable, and with the possibility of using metal or polymer sleeves along their lengths or applying an inner lining made of fiber glass or any other material aimed at increasing the strength of large diameter pipes to support taller water columns heights and higher pressures, as is the case with industrial sheds or taller housing buildings; vertical cylindrical pipes (2) are based on the principle of communicating vases whose bases are interconnected by means of interconnecting ducts (7), with the water being stored in these vertical cylindrical pipes (2); the top of the modules formed by cylindrical pipes (2) is also interconnected by interconnecting ducts (7), much like the bottom interconnection.

The vertical pipes are filled and emptied in counterphase with the input and output of atmospheric air through the collection duct (3), which is attached to the gutter (4) that receives the water from the roof (4A).

Each vertical cylindrical pipe (2) is provided with two plugs (5) on both ends of the pipe, top and bottom, using glue and pressure. We also see two structuring elements (6) for each vertical cilyndrical pipe, whose functions are described as follows.

1—to provide support between the vertical cilyndrical pipes (2) so as to allow for all the elements of the EQUIPMENT FOR CAPTURING AND STORING RAINWATER AND WATER OF OTHER ORIGINS (1) to work as a single unit in terms of structure, in such a way that any alien force applied to any of the components of the module, object of the present patent, will be absorbed by all elements of the module;

2—to work as the element that keeps the vertical cilyndrical pipes (2) fixed on the ground—using screws (8) or any other appropriate method—and between them through the plug(5) to which each vertical cilyndrical pipe (2) is attached at its bottom.

3—to work as the element that keeps the vertical cilyndrical pipes (2) fixed between them through the plug (5) to which each vertical cilyndrical pipe (2) is attached at its top.

4—to house and protect the interconnecting ducts (7) whose work is to functionally connect the vertical cylindrical pipe (2) at the base, for water circulation, and at the top, for atmosphere air circulation. FIG. 5 shows a conventional rainwater collecting gutter (4), which can also be used for catching water from other sources and sending it on to other destinations.

Figure 6:
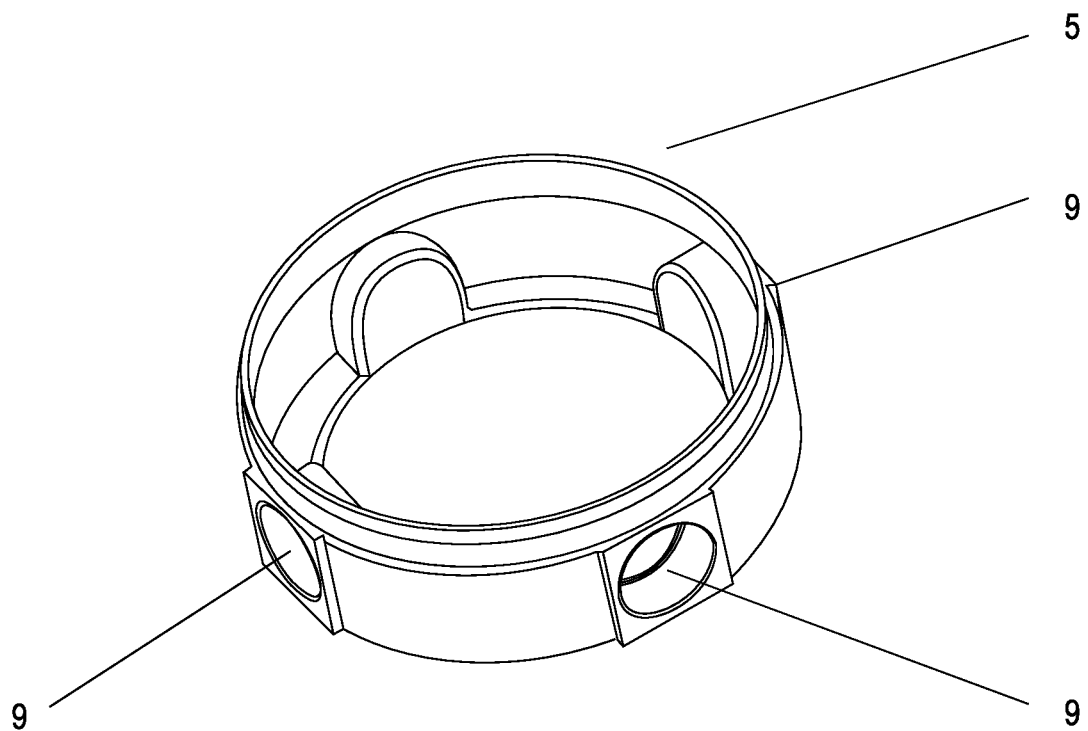
FIG. 6 shows an inside perspective view of the plug.

FIG. 6 shows a perspective view of one of the plugs (5) to illustrate its construction details such as the four holes (9) into which the interconnecting ducts (7) are mounted in order to create the communicating vases and receive the ducts and valves through which stored water is released.

Figure 7:
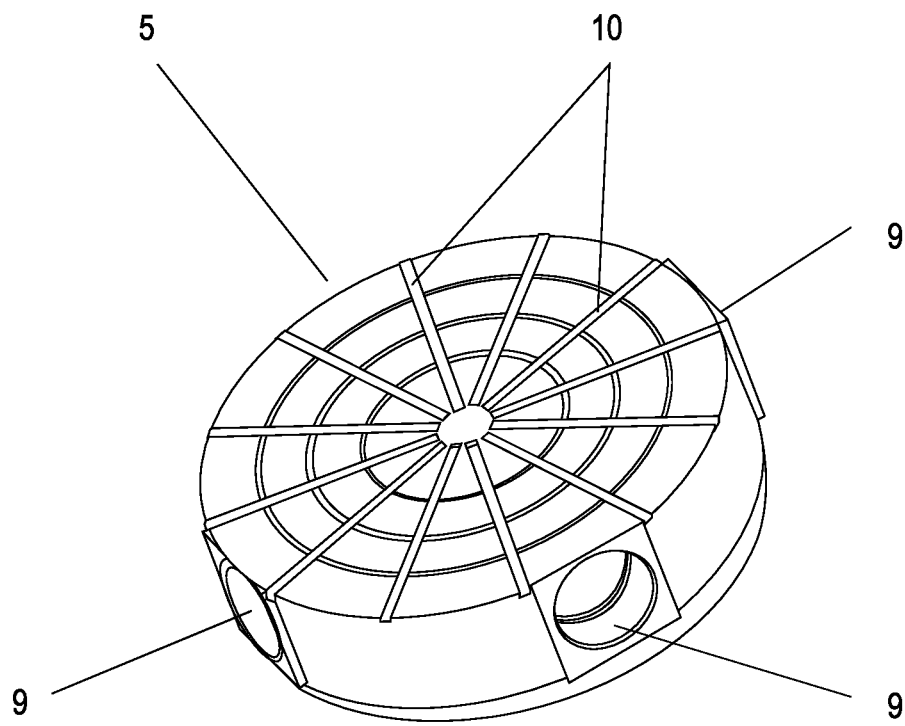
FIG. 7 shows a perspective view of the plug.

FIG. 7 shows a perspective view of one of the plugs (5) to illustrate its construction details, such as the four holes (9) on its side and the low reliefs (10) on the discoidal external face of the plug (5), whose diameters meet those of typical tubes available in the marketplace, which are designed to serve as a guide, e.g., for a diamond hole saw used to drill the hole that shall be used to connect the vertical cylindrical pipe (2) with the water input duct (3) shown in FIG. 5.

Figure 8:
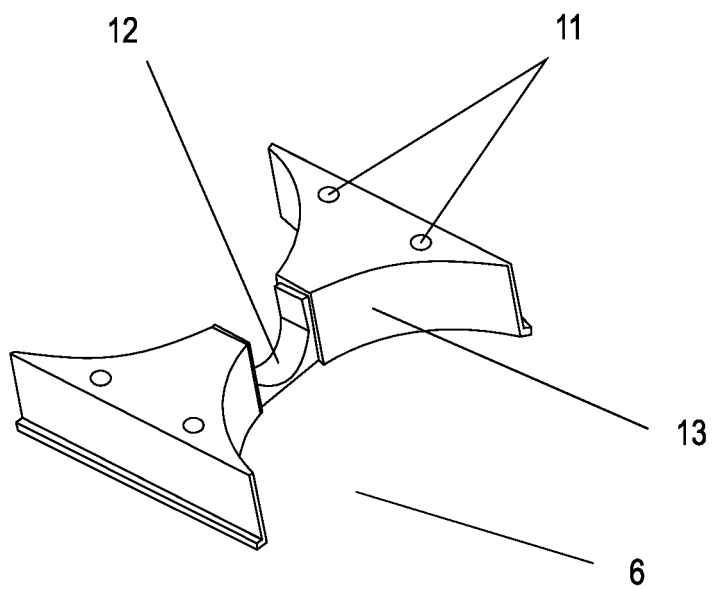
FIG. 8 shows a perspective view of the structuring profile of the set.

FIG. 8 shows a perspective view to illustrate one of the two uniquely shaped structuring elements (6) designed to be used on each vertical cylindrical pipe (2), one of which being inserted and glued into the plugs (5) of the pipe, one into the top plug and the other one into the bottom plug, so as to keep them firmly together, both physically and functionally, as previously described. We can also see the four holes (11) through which the screws pass (8), as shown in FIG. 5, in order to fix the structuring element (6) to the ground, the cradle (12) that holds and protects the connecting ducts (7), and the two small pieces of cylinder placed contiguously in relation to the vertical cylindrical ducts (2).

The invention claimed is:

1. Apparatus useful for rainwater capture and storage comprising:
   a plurality of tubes, a duct structure deployed at both tube bottom and tube top providing fluid communication between adjacent tubes,
   the duct structure further comprising a plug, a duct, and a cradle,
      the plug located across the tube bottom opening and tube top opening and further comprising holes configured to line up with holes in the adjacent tube wall,
      the duct configured to form a fluid tight connection between adjacent tubes,
      the cradle positioned between adjacent tubes and configured to hold the duct and adjacent tubes in position,
      the cradle further comprising:
         opposite surfaces configured to rigidly attach to adjacent tube sides and to hold the tubes in position,
         a central bore configured to hold the duct in position, and
         holes for screws to fix the cradle to a ground surface,
   wherein the apparatus captures and stores rainwater entering the tube top.

* * * * *